United States Patent [19]

Shinohara et al.

[11] Patent Number: 5,043,012

[45] Date of Patent: Aug. 27, 1991

[54] GLAZING AGENT FOR AN AUTOMOBILE

[75] Inventors: Seigo Shinohara, Chigasaki; Kiyoshi Okamura, Fujisawa; Tetsuo Kijima, Machida, all of Japan

[73] Assignee: Taiho Industries Co., Ltd., Tokyo, Japan

[21] Appl. No.: 366,387

[22] Filed: Jun. 15, 1989

[30] Foreign Application Priority Data

Dec. 3, 1988 [JP] Japan .................. 63-306699

[51] Int. Cl.$^5$ .............................. C09G 1/06
[52] U.S. Cl. ............................ 106/10; 106/3
[58] Field of Search ..................... 106/3, 10

[56] References Cited

U.S. PATENT DOCUMENTS 4,354,871 10/1982 Sutton .................... 106/10
4,398,953 8/1983 van der Linde ............ 106/10

OTHER PUBLICATIONS

Hackh et al., *Chemical Dictionary*, 5th Edition, p. 366.

*Primary Examiner*—Mark L. Bell
*Assistant Examiner*—Deborah Jones
*Attorney, Agent, or Firm*—Browdy and Neimark

[57] ABSTRACT

The glazing agent contains at least one member selected from a group consisting of a petroleum solvent, silicone oil and wax and at least one member selected from a group consisting of a lower alcohol, oil-soluble ionic surfactant and silicone resin.

The glazing agent is excellent in detergency of a stain, or lime deposit, particularly on a coating surface of the vehicle body, as well as in water repelency and its continuity.

16 Claims, No Drawings

GLAZING AGENT FOR AN AUTOMOBILE

BACKGROUND OF THE INVENTION

1. Field of the Invention

The present invention relates to a glazing agent for an automobile and, more particularly, to a glazing agent for an automobile, which is excellent in water repellency and in detergency for wiping off a stain from a coating surface of the vehicle, particularly, a stain based mainly on oil fumes originating from exhaust gases and which is extremely difficult to remove by usual washing or cleansing or a car washer (such a stain being sometimes called "lime deposit" herein).

2. Description of Related Art

Heretofore, various attempts have been made for glazing agents for an automobile to enhance their water repellency in order to improve detergency for wiping off lime deposit on a coating surface of the vehicle and to prevent deterioration of the coating surface. Conventional glazing agents of a so-called oil-based solid type are relatively good in providing water repellency on the coating surface yet insufficient in detergency for washing or wiping off such lime deposit on the coating surface. Accordingly, when the coating surface of a vehicle is treated with such glazing agents of an oil-based solid type, a coating surface is provided with a favorable water repellency, however, such a coating surface is poor in outlook because lime deposit originating from oil fumes cannot be washed off to a sufficient extent.

A method for providing a coating surface with a favorable outlook by removing lime deposit is such that the coating surface is treated with an emulsion wax. This method provides the surface with an outlook which does not show such a stain, however, a gloss and water repellency on the coating surface treated with an emulsion wax are insufficient. Thus, a repeated treatment with the emulsion wax is required in a short time after treatment with the wax. This is very laborious.

In order to provide a favorable outlook on a coating surface of a vehicle as well as a long-lasting gloss and water repellency, the coating surface of a vehicle should be treated first with an emulsion wax and then with a glazing agent of an oil-based solid type. However, this is extremely laborious.

SUMMARY OF THE INVENTION

The present invention has the object to provide a glazing agent with a favorable and long-lasting water repellency on a coating surface of a vehicle and with excellent detergency for washing or wiping off lime deposit thereon.

In order to achieve the object, the present invention consists of a glazing agent comprising petroleum solvent, a silicone oil and/or a wax and at least one member selected from the group consisting of a lower alcohol, a surfactant of an oil-soluble ionic type and a silicone resin.

DETAILED DESCRIPTION OF THE PREFERRED EMBODIMENTS

The glazing agent according to the present invention contains the petroleum solvent, silicone oil and/or wax as one component.

The petroleum solvent to be used may include, for example, petroleum naphtha, solvent naphtha, petroleum ether, petroleum benzine, isoparaffin, normal paraffin, decalin, industrial gasoline, ligroin, lamp oil and aliphatic hydrocarbons. The petroleum solvent may be used singly or in combination with the other solvent or solvents. Preferred are petroleum naphtha, solvent naphtha and aliphatic hydrocarbons. An amount of the petroleum solvent in the glazing agent may be in the range from 30% to 80% by weight.

The silicone oil to be used may be one in an oily or grease form and be generally referred to as silicone oil or grease-oil compound. The silicone oil may include, for example, dimthyl silicone, phenyl silicone, amino-modified silicone, alkyl-modified silicone, methyl-phenyl silicone and polyether-modified silicone. Dimethyl silicone, phenyl silicone and amino-modified silicone are preferred. The silicone oil has a viscosity ranging from about 30 cst to 10,000 cst. It may also be used singly or admixed with two or more of the silicone oil and in an amount ranging from 5% to 20% by weight on the basis of a weight of the glazing agent.

The wax to be used may include, for example, vegetable wax such as carnauba wax, haze wax, candelilla wax and rice wax; animal wax such as bees wax, insect wax, shellac wax and whale wax; petroleum wax such as paraffin wax, microcrystalline wax, polyethylene wax, ester wax and oxide wax; and mineral wax such as montan wax, ozocerite and ceresine. On top of these wax, it may include, for example, a higher aliphatic acid such as palmitic acid, stearic acid, margaric acid and behenic acid; a higher alcohol such as palmityl alcohol, stearyl alcohol, behenyl alcohol, marganyl alcohol, myricyl alcohol and eicosanol; a higher aliphatic acid ester such as cetyl palmitate, myricyl palmitate, cetyl stearate and myricyl stearate; an amide such as acetamide, propionic amide, palmitic amide, stearic amide and amide wax; and a higher amine such as stearyl amine, behenyl amine and palmityl amine. The wax preferably has a melting point ranging from 50° C. to 130° C. as a result of measurement using a Model Yanagimoto MJP-2 device and particle sizes ranging generally from 0.1 to 10 $\mu$m, preferably from 0.5 to 2 $\mu$m. The wax may be used singly or in combination with one or more other waxes and in amounts ranging generally from 2% to 20% by weight, preferably from 5% to 15% by weight.

Preferably, the silicone oil and wax are used singly or in combination with each other.

The glazing agent according to the present invention contains, as another component, at least one of the lower alcohol, oil-soluble ionic type surfactant and silicone resin.

The lower alcohol to be used may include, for example, a monovalent alcohol such as methyl alcohol, ethyl alcohol, n-propyl alcohol, isopropyl alcohol, n-butyl alcohol, isobutyl alcohol, sec-butyl alcohol, tert-butyl alcohol, ally alcohol, crotyl alcohol and 2-butenol-1; a divalent alcohol such as ethylene glycol, propylene glycol and diethyl glycol; and a glycol ether such as ethylene glycol monomethyl ether, ethylene glycol monoethyl ether, ethylene glycol monobutyl ether and ethylene glycol dimethyl ether. Among the lower alcohols, a lower alcohol having from one to five carbon atoms is preferred and ethanol, ethanol and isopropyl alcohol are more preferred. The lower alcohol may be used singly or in combination with the other lower alcohol or alcohols. An amount of the lower alcohol may range generally from 1% to 30% by weight, preferably from 2% to 20% by weight.

The surfactant of the oil-soluble ionic type may include an oil-soluble anionic, cationic and amphoteric surfactant and no limits are placed on kinds of the surfactants as long as they do not impair the object of the present invention.

The anionic surfactants may specifically include, for example, an aliphatic acid salt; a higher aliphatic acid salt such as rosined soap, an N-acyl carboxylate and a carboxylic acid ether; a sulfonate such as an alkyl sulfonate, a sulfosuccinate, a sulfonic acid ester, an alkylbenzene sulfonate, an alkylally sulfonate, an alkylnaphthalene sulfonate and an N-acyl sulfonate; a sulfuric acid ester such as sulfonated oil, a sulfuric acid ester, an alkyl sulfate, a sulfuric acid ether, a sulfuric acid alkylallyl ether and a sulfuric acid amide; a phosphoric acid ester such as an alkyl phosphate, a phosphoric acid ether, a phosphoric acid alkylallyl ether and a phosphoric acid amide; and a sulfonic acid salt of formalin condensation type. Preferred are an alkanol amine or an amine salt of the alkylbenzene sulfonate, an alkanol amine or an amine salt of the alkyl sulfonate, a metal salt of the alkyl phosphate as well as a metal salt of the higher aliphatic acid.

As the cationic surfactant may be enumerated an aliphatic amine salt such as a primary amine salt, a secondary amine salt, a tertiary amine salt, a quaternary ammonium salt, hydroxyammonium salt and an ether ammonium salt; a quaternary ammonium salt of the aliphatic amine salt; and an aromatic quaternary ammonium salt such as benzalconium salt, benzetonium salt, pyridinium salt and imidazolinium salt. Preferred are a tertiary amine salt such as stearic acid diethylamide, a quaternary ammonium salt such as stearyl chloride trimethyl ammonium, and a benzalconium salt such as stearyl chloride dimethyl benzylammonium.

The amphoteric surfactants may include, for example, a betaine such as carboxyl betaine and sulfobetaine, an aminocarboxylic acid, and imidazoline derivatives. Preferred are imidazoline derivatives.

The oil-soluble ionic surfactants may be used singly or in combination with the other surfactant and surfactants. An amount of the surfactants may be in the range generally 5.0% by weight or lower, preferably from 0.05% to 2% by weight.

The silicone resin to be used may include, for example, a silicone resin modified by silanol, alkoxy, hydrodiene, acetoxy, oxime, enoxy, aminoxy, amidoxy or amino. Particularly, silanol modified, alkoxy modified, and oxime modified silicone resin are preferred.

Preferred compositions of the glazing agent according to the present invention may include, for example:

a composition comprising the petroleum solvent, the silicone oil and/or wax as well as the lower alcohol;

a composition comprising the petroleum solvent, the silicone oil and/or wax as well as the oil-soluble ionic surfactant;

a composition comprising the petroleum solvent, the silicone oil and/or wax as well as the lower alcohol and the oil-soluble ionic surfactant; and a composition comprising the petroleum solvent, the silicone oil and/or wax as well as the silicone resin.

Particularly, the glazing agent having the composition comprising the petroleum solvent, the silicone oil and/or wax as well as the lower alcohol and/or the oil-soluble ionic surfactant can provide a coating surface with a long-lasting water repellency on top of detergency for washing or wiping off lime deposit from the coating surface of the vehicle.

Furthermore, the glazing agent having the composition comprising the petroleum solvent, the silicone oil and/or wax as well as the silicone resin reduces it viscosity to a remarkable extent during the step of cooling after heating a mixture of these components and turns to a slurry form. When it is coated on a coating surface of the vehicle body, it can be elongated to a sufficiently wide extent and, furthermore, wiped off easily after coating.

The glazing agent according to the present invention may additionally contain an abrasive material. The abrasive material may be one of a powder type which has been used conventionally and may include, for example, diatomaceous earth, alumina, silica and zirconium oxide. The abrasive material may have particle sizes in the range of generally 10 $\mu$m or smaller, preferably from 1 to 5 $\mu$m.

The glazing agent according to the present invention may be prepared in conventional manner, for example, by admixing the petroleum solvent with at least one member selected from the group consisting of the petroleum solvent, the silicone oil and the wax and at least one member selected from the group consisting of the lower alcohol, the oil-soluble ionic surfactant and the silicone resin and additionally with the abrasive material, if desired, and stirring the mixture at one time or, preferably, by dispersing the silicone oil and/or the wax and, if desired, the abrasive material in the petroleum solvent and then by admixing at least one member selected from the group consisting of the lower alcohol, the oil-soluble ionic surfactant and the silicone resin with the resulting dispersion.

The resulting glazing agent according to the present invention possesses an excellent detergency for washing or wiping off a stain such as lime deposit from a coating surface of the vehicle as well as a favorable and long-lasting water repellency.

The present invention will then be described by way of examples.

EXAMPLE 1

A mixture of 70 parts by weight of naphtha (product of Nippon Sekiyu K. K.; "Mineral Spirit A") with 5 parts by weight of carnauba wax (trade name: Carnauba #1), 10 parts by silicone oil ("SH-200"; Toray Silicone K. K.; viscosity, 1,000 cst), and 5 parts by weight of silica ("Hi-Silica"; Tsuchiya Kaolin Kogyo K. K.; particle sizes: 2 $\mu$m; under 2 $\mu$m: 95%) was stirred at 90° C. for 1.5 hours, yielding a suspension.

To this suspension was added 5% methyl alcohol, and the mixture was stirred for 1.0 hour yielding a glazing agent.

The resulting glazing agent was observed for its characteristics with respect to its water repellency and its detergency by means of test procedures which follow.

Test results are shown in Table below.

Test Procedures for Water Repellency

The glazing agents prepared by this example and examples which follow are coated with a sponge on a surface of the vehicle body and the coating is then wiped with a dry towel, thus forming a coating. Then the vehicle body is washed with water and brushed using a car washer. This procedures are repeated until its water repellency is lost. A continuity of water repellency is evaluated by the number in which the procedures are repeated until its repellency has been lost. In this case, a state in which the water repellency is lost is such that water drops adhered to the coating surface elongate or spread in a continuous manner when such water drops are to adhere to the surface inclined at angles of 40 to 45 degrees.

In Table below, water repellency is rated as follows:

⊚: No water repellency was lost when the body was washed more than ten times.

○: Water repellency was lost when it was washed from 7 to 10 times.

Δ: Water repellency was lost when it was washed from 4 to 10 times.

×: Water repellency was lost when it was washed three times or less.

Test Procedures for Detergency

A white coated plate for an automobile on which lime deposit has been uniformly formed was treated by wiping off the lime deposit with a sponge which has been impregnated with the glazing agent as test samples. Such a white coated plate without treatment with the glazing agent is evaluated as a blank specimen. Thereafter, the coated plates were analyzed for whiteness in accordance with the test procedures of JIS-P-8123. A detergency of the glazing agent is rated by degrees of whiteness. For measurement for whiteness, an automatica color analyzer (Model "TOPSCAN TC-1800MK-II"; Tokyo Densyoku K. K.) was used.

As a result of measurement, it has been found that a degree of whiteness for the blank specimen was 55%.

In Table below, detergency is rated as follows:

⊚: Degree of whiteness: 65% or higher; little stain left.

○: Degree of whiteness: 60%-65%; most of stain wiped off.

Δ: Degree of whiteness: 55%-60%; some degree of stain wiped off.

×: Degree of whiteness: lower than 55%; no stain wiped off.

EXAMPLE 2

A glazing agent having the composition as shown below was prepared and then tested in the same manner in Example 1.

In the composition, naphtha, carnauba wax and silicone oil were the same as used in Example 1.

| Components | Amounts (parts by weight) |
|---|---|
| Naphtha | 70 |
| Carnauba wax | 10 |
| Silicone oil | 10 |
| Ethyl alcohol | 10 |

Results are shown in Table below.

EXAMPLE 3

A glazing agent having the composition as shown below was prepared and then tested in the same manner in Example 1.

In the composition, naphtha, carnauba wax and silicone oil were the same as used in Example 1.

| Components | Amounts (parts by weight) |
|---|---|
| Naphtha | 65 |
| Carnauba wax | 5 |
| Silicone oil | 10 |
| Isopropyl alcohol | 10 |
| Alumina ("Hizirite A42-2"; Showa Keikinzoku K.K.; particle sizes: 5 μm) | 10 |

Results are shown in Table below.

EXAMPLE 4

A glazing agent having the composition as shown below was prepared and then tested in the same manner in Example 1.

In the composition, naphtha and silicone oil were the same as used in Example 1.

| Components | Amounts (parts by weight) |
|---|---|
| Naphtha | 75 |
| Paraffin wax | 10 |
| Silicone oil | 10 |
| Ethylene glycol monoethyl ether | 5 |

Results are shown in Table below.

EXAMPLE 5

A glazing agent having the composition as shown below was prepared and then tested in the same manner in Example 1.

In the composition, naphtha, carnauba wax and silicone oil were the same as used in Example 1.

| Components | Amounts (parts by weight) |
|---|---|
| Naphtha | 70 |
| Carnauba wax | 10 |
| Silicone oil | 10 |
| Ethylene glycol monoethyl ether | 10 |

Results are shown in Table below.

EXAMPLE 6

A glazing agent having the composition as shown below was prepared and then tested in the same manner in Example 1.

In the composition, naphtha, carnauba wax, silicone oil and alumina were the same as used in Example 3.

| Components | Amounts (parts by weight) |
|---|---|
| Naphtha | 60 |
| Carnauba wax | 5 |
| Silicone oil | 10 |
| Oxide wax ("Hoechst S Wax"; Hoechst K.K.; melting points: 81-87° C.) | 5 |
| Ethyl alcohol | 5 |
| Alumina | 10 |

Results are shown in Table below.

EXAMPLE 7

A glazing agent having the composition as shown below was prepared and then tested in the same manner in Example 1.

In the composition, naphtha, carnauba wax, silicone oil and alumina were the same as used in Example 3.

| Components | Amounts (parts by weight) |
| --- | --- |
| Naphtha | 60 |
| Carnauba wax | 5 |
| Polyethylene wax ("Hi-Wax 200P"; Mitsui Sekiyu Kagaku K.K.) | 5 |
| Silicone oil | 10 |
| Isopropyl alcohol | 10 |
| Alumina | 10 |

Results are shown in Table below.

EXAMPLE 8

A glazing agent having the composition as shown below was prepared and then tested in the same manner in Example 1.

In the composition, naphtha, carnauba wax, silicone oil and silica were the same as used in Example 1.

| Components | Amounts (parts by weight) |
| --- | --- |
| Naphtha | 60 |
| Carnauba wax | 5 |
| Bees wax | 5 |
| Silicone oil | 10 |
| Methyl alcohol | 5 |
| Ethylene glycol monoethyl ether | 5 |
| Silica | 10 |

Results are shown in Table below.

EXAMPLE 9

A glazing agent having the composition as shown below was prepared and then tested in the same manner in Example 1.

In the composition, naphtha, carnauba wax, silicone oil and alumina were the same as used in Example 3.

| Components | Amounts (parts by weight) |
| --- | --- |
| Naphtha | 78 |
| Carnauba wax | 5 |
| Silicone oil | 10 |
| Alkylbenzene sulfonate triethanol amine | 2 |
| Alumina | 5 |

Results are shown in Table below.

EXAMPLE 10

A glazing agent having the composition as shown below was prepared and then tested in the same manner in Example 1.

In the composition, naphtha, carnauba wax, and silicone oil were the same as used in Example 1.

| Components | Amounts (parts by weight) |
| --- | --- |
| Naphtha | 78 |
| Carnauba wax | 5 |
| Silicone oil | 10 |
| Stearyl chloride trimethyl ammonium | 2 |
| Diatomaceous earth ("Cerite #315; Manville Speciality Products Group Corporation) | 5 |

Results are shown in Table below.

EXAMPLE 11

A glazing agent having the composition as shown below was prepared and then tested in the same manner in Example 1.

In the composition, naphtha, carnauba wax, silicone oil and alumina were the same as used in Example 3.

| Components | Amounts (parts by weight) |
| --- | --- |
| Naphtha | 64 |
| Carnauba wax | 10 |
| Silicone oil | 10 |
| Methyl alcohol | 10 |
| Alkylbenzene sulfonate triethanol amine | 1 |
| Alumina | 5 |

Results are shown in Table below.

EXAMPLE 12

A glazing agent having the composition as shown below was prepared and then tested in the same manner in Example 1.

In the composition, naphtha, carnauba wax, silicone oil and silica were the same as used in Example 1.

| Components | Amounts (parts by weight) |
| --- | --- |
| Naphtha | 69 |
| Carnauba wax | 5 |
| Silicone oil | 10 |
| Ethyl alcohol | 10 |
| Stearyl chloride trimethyl ammonium | 1 |
| Silica | 5 |

Results are shown in Table below.

COMPARATIVE EXAMPLE 1

A glazing agent having the composition as shown below was prepared and then tested in the same manner in Example 1.

In the composition, naphtha, carnauba wax, and silicone oil were the same as used in Example 1.

| Components | Amounts (parts by weight) |
| --- | --- |
| Naphtha | 80 |
| Carnauba wax | 10 |
| Silicone oil | 10 |

Results are shown in Table below.

COMPARATIVE EXAMPLE 2

A glazing agent having the composition as shown below was prepared and then tested in the same manner in Example 1.

In the composition, naphtha, carnauba wax, silicone oil and oxide wax were the same as used in Example 6.

| Components | Amounts (parts by weight) |
| --- | --- |
| Naphtha | 70 |
| Carnauba wax | 10 |
| Silicone oil | 15 |
| Oxide wax | 5 |

Results are shown in Table below.

COMPARATIVE EXAMPLE 3

A glazing agent having the composition as shown below was prepared and then tested in the same manner in Example 1.

In the composition, naphtha, carnauba wax and oxide wax were the same as used in Example 6. Diatomaceous earth was the same as used in Example 10.

| Components | Amounts (parts by weight) |
|---|---|
| Naphtha | 30 |
| Carnauba wax | 2 |
| Water | 53 |
| Oxide wax | 2 |
| Oleic acid | 2 |
| Morpholine | 1 |
| Diatomaceous earth | 10 |

Results are shown in Table below.

COMPARATIVE EXAMPLE 4

A glazing agent having the composition as shown below was prepared and then tested in the same manner in Example 1.

In the composition, naphtha, carnauba wax and silicone oil were the same as used in Example 6. Diatomaceous earth was the same as used in Example 10.

| Components | Amounts (parts by weight) |
|---|---|
| Naphtha | 75 |
| Carnauba wax | 5 |
| Silicone oil | 10 |
| Diatomaceous earth | 10 |

Results are shown in Table below.

EXAMPLE 13

A glazing agent was prepared in substantially the same manner as in the above examples by admixing the components having the composition as shown hereinbelow.

The resulting glazing agent was evaluated in the same manner as in the above examples.

| Components | Amounts (parts by weight) |
|---|---|
| Polyethylene wax | 8.0 |
| Carnauba wax | 0.5 |
| Dimethyl silicone (10,000 cst) ("TSF-45"; Toshiba K.K.) | 5.0 |
| Alkyl modified silicone oil ("SH-203"; Toray, Inc.) | 2.0 |
| Oxime modified silicone resin ("SD-8000"; Toray, Inc.) | 10.0 |
| Alumina | 10.0 |
| Diatomaceous earth | 2.0 |
| Aliphatic hydrocarbon ("Isosol"; Nippon Sekiyu K.K.) | 57.0 |
| Methyl cellosolve | 3.0 |
| n-Butanol | 2.0 |
| Perfume | 0.2 |

EXAMPLE 14

A glazing agent was prepared in substantially the same manner as in the above examples by admixing the components having the composition as shown hereinbelow.

The resulting glazing agent was evaluated in the same manner as in Example 1.

| Components | Amounts (parts by weight) |
|---|---|
| Polyethylene wax | 5.0 |
| Carnauba wax | 0.5 |
| Dimethyl silicone ("TSF-45"; Toshiba K.K.)(1,000 cst) | 5.0 |
| Alkyl modified silicone oil ("SH-203"; Toray, Inc.) | 2.5 |
| Alkoxy modified silicone resin ("SH-7020"; Toray, Inc.) | 8.0 |
| Aliphatic hydrocarbon ("Isosol 300"; Nippon Sekiyu K.K.) | 73.8 |
| Perfume | 0.2 |

TABLE

| | DETERGENCY | REPELLENCY |
|---|---|---|
| EXAMPLE | | |
| 1 | ○ | ⊙ |
| 2 | ○ | ⊙ |
| 3 | ⊙ | ⊙ |
| 4 | ○ | ⊙ |
| 5 | ○ | ⊙ |
| 6 | ⊙ | ⊙ |
| 7 | ⊙ | ⊙ |
| 8 | ○ | ⊙ |
| 9 | ⊙ | ○ |
| 10 | ○ | ○ |
| 11 | ⊙ | ⊙ |
| 12 | ⊙ | ⊙ |
| 13 | ⊙ | ⊙ |
| 14 | X | ⊙ |
| COMPARATIVE EXAMPLE | | |
| 1 | X | ⊙ |
| 2 | X | ⊙ |
| 3 | ⊙ | X |
| 4 | Δ | ⊙ |

What is claimed is:

1. A glazing agent consisting essentially of petroleum solvent in an amount ranging from 30% to 80% by weight, silicone oil in an amount ranging from 5% to 20% by weight, wax in an amount ranging from 2% to 20% by weight and at least one member selected from a group consisting of a lower alcohol in an amount ranging from 1% to 30% by weight, oil-soluble ionic surfactant in an amount up to 5.0% by weight and silicone resin.

2. A glazing agent as claimed in claim 1, wherein said petroleum solvent is naphtha, an aliphatic hydrocarbon or solvent naphtha.

3. A glazing agent as claimed in claim 1, wherein said silicone oil is dimethyl silicone, phenyl silicone or amino modified silicone.

4. A glazing agent as claimed in claim 1, wherein said silicone oil has a viscosity in the range from 300 cst to 10,000 cst.

5. A glazing agent as claimed in claim 1, wherein said wax is a vegetable wax, animal wax, petroleum wax, mineral wax, higher aliphatic acid, higher alcohol, higher aliphatic ester, aliphatic acid amide, or a higher aliphatic amine.

6. A glazing agent as claimed in claim 1, wherein said wax has a melting point ranging from 50° C. to 130° C.

7. A glazing agent as claimed in claim 1, wherein said wax has a particle size ranging from 0.1 to 10 μm.

8. A glazing agent as claimed in claim 1, wherein said lower alcohol is a monovalent or divalent aliphatic alcohol having from 1 to 5 carbon atoms or a glycol ether.

9. A glazing agent as claimed in claim 1, containing said lower alcohol.

10. A glazing agent as claimed in claim 1, wherein said oil-soluble ionic surfactant is an anionic, cationic or amphoteric surfactant.

11. A glazing agent as claimed in claim 1, wherein said surfactant is an alkanol amine or a quaternary ammonium salt of an alkylbenzene sulfonate.

12. A glazing agent as claimed in claim 1 containing said surfactant.

13. A glazing agent as claimed in claim 1, wherein said silicone resin is a silanol modified, alkoxy modified, hydrodiene modified, acetoxy modified, oxime modified, enoxy modified, aminoxy modified, acidoxy modified, or amino modified silicone resin.

14. A glazing agent according to claim 1, further comprising abrasive material having a particle size of 10 micrometers or smaller in an amount ranging from 2% to 20% by weight.

15. A glazing agent consisting essentially of petroleum solvent in an amount ranging from 30% to 80% by weight; a member selected from the group consisting of silicone oil in an amount ranging from 5% to 20% by weight,
   wax in an amount of 2–20% by weight and a mixture thereof; and
   at least one member selected from a group consisting of a lower alcohol in an amount ranging from 1% to 30% by weight, oil-soluble ionic surfactant in an amount up to 5.0% by weight and silicone resin.

16. A glazing agent according to claim 1, further comprising 2–20% by weight of an abrasive having a particle size up to 10 μm.

* * * * *